US011425342B2

(12) United States Patent
Singh et al.

(10) Patent No.: US 11,425,342 B2
(45) Date of Patent: Aug. 23, 2022

(54) SYSTEMS AND METHODS FOR MEDIA PROJECTION SURFACE SELECTION

(71) Applicant: Rovi Guides, Inc., San Jose, CA (US)

(72) Inventors: Gyanveer Singh, Bihar (IN); Susanto Sen, Karnataka (IN); Shakir Sharfraz Ashfaq Ahamed, Karnataka (IN); Sriram Ponnuswamy, Tamil Nadu (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/072,097

(22) Filed: Oct. 16, 2020

(65) Prior Publication Data

US 2021/0144346 A1    May 13, 2021

Related U.S. Application Data

(63) Continuation of application No. 16/143,728, filed on Sep. 27, 2018, now Pat. No. 10,841,544.

(51) Int. Cl.
*G06K 9/00* (2022.01)
*H04N 9/31* (2006.01)
*G06T 7/80* (2017.01)
*G06V 20/64* (2022.01)

(52) U.S. Cl.
CPC ............... *H04N 9/312* (2013.01); *G06T 7/80* (2017.01); *G06V 20/64* (2022.01); *H04N 9/3176* (2013.01)

(58) Field of Classification Search
None
See application file for complete search history.

(56) References Cited

U.S. PATENT DOCUMENTS

| 8,104,892 | B2 |  | 1/2012 | Hillis et al. |
| 8,226,235 | B2 |  | 7/2012 | Roberts et al. |
| 8,589,796 | B2 |  | 11/2013 | Moesgaard et al. |
| 8,840,250 | B1 | * | 9/2014 | Yao .................. G01S 17/46 353/30 |
| 9,336,607 | B1 | * | 5/2016 | Chang ................ G06T 7/73 |
| 9,818,369 | B1 | * | 11/2017 | Beaven ................ G09G 5/003 |

(Continued)

FOREIGN PATENT DOCUMENTS

EP    2295932 B1    10/2014

OTHER PUBLICATIONS

Fender, et al., "OptiSpace: automated placement of interactive 3D porjection mapping content", "OptiSpace: automated placement of interactive 3D porjection mapping content", CHI 2018 (Apr. 2018).

(Continued)

*Primary Examiner* — Soo Jin Park
(74) *Attorney, Agent, or Firm* — Haley Guiliano LLP

(57) ABSTRACT

Methods and systems are provided for automatically selecting a target area to project content thereon. For example, a projection device receives content to be projected and content attributes of the content. The projection device also captures images of candidate areas and determines candidate area characteristics based on the captured images. The projection device generates a respective quality-of-projection indicator based on the content attributes and the candidate area characteristics. The projection device selects the candidate area with the highest quality-of-projection indicator as the target area on which the content is to be projected.

20 Claims, 12 Drawing Sheets

(56) References Cited

U.S. PATENT DOCUMENTS

| | | | |
|---|---|---|---|
| 10,297,179 B2 | 5/2019 | Doi et al. | |
| 10,462,421 B2 * | 10/2019 | Rintel | G06F 3/013 |
| 10,511,818 B2 | 12/2019 | Raffa et al. | |
| 10,589,665 B2 * | 3/2020 | Sakata | B60Q 1/50 |
| 10,594,993 B2 | 3/2020 | Kim et al. | |
| 2013/0024296 A1 * | 1/2013 | Sivertsen | G06Q 30/0242 |
| | | | 705/14.71 |
| 2015/0193915 A1 | 7/2015 | Shinde | |
| 2017/0026612 A1 | 1/2017 | Rintel et al. | |
| 2019/0121522 A1 * | 4/2019 | Davis | G06F 3/04815 |
| 2020/0106996 A1 | 4/2020 | Singh et al. | |
| 2021/0053483 A1 * | 2/2021 | Takeyasu | B60Q 1/085 |
| 2021/0144346 A1 | 5/2021 | Singh et al. | |

OTHER PUBLICATIONS

Funk, et al., "Automatic projection positioning based on surface suitability", "Automatic projection positioning based on surface suitability", The 5th International Symposium on Pervasive Displays (PerDis'16) (Year: 2016).

\* cited by examiner

400

402 — Capture an Image of a Candidate Surface Within the Projectable Area

404 — Determine One or More Characteristics of Size, Texture, Color, Reflectivity, Intensity, and Amount of Ambient Light from the Captured Image

406 — Assign a Respective Score for Each of Determined Characteristic for the Candidate Surface

408 — Extract One or More Characteristics of Size, Texture, Color, Reflectivity, Intensity, and Amount of Ambient Light from the Received Content Attributes

410 — Assign a Respective Score for Each Identified Characteristic for the Content

412 — Multiply the Respective Scores Assigned for Each Characteristic for the Candidate Area to the Respective Scores Assigned for Each Identified Characteristic for the Content to Generate Combined Characteristics Score

414 — Generate the Quality-of-projection Indicator by Adding the Respective Combined Characteristics Scores

FIG. 4

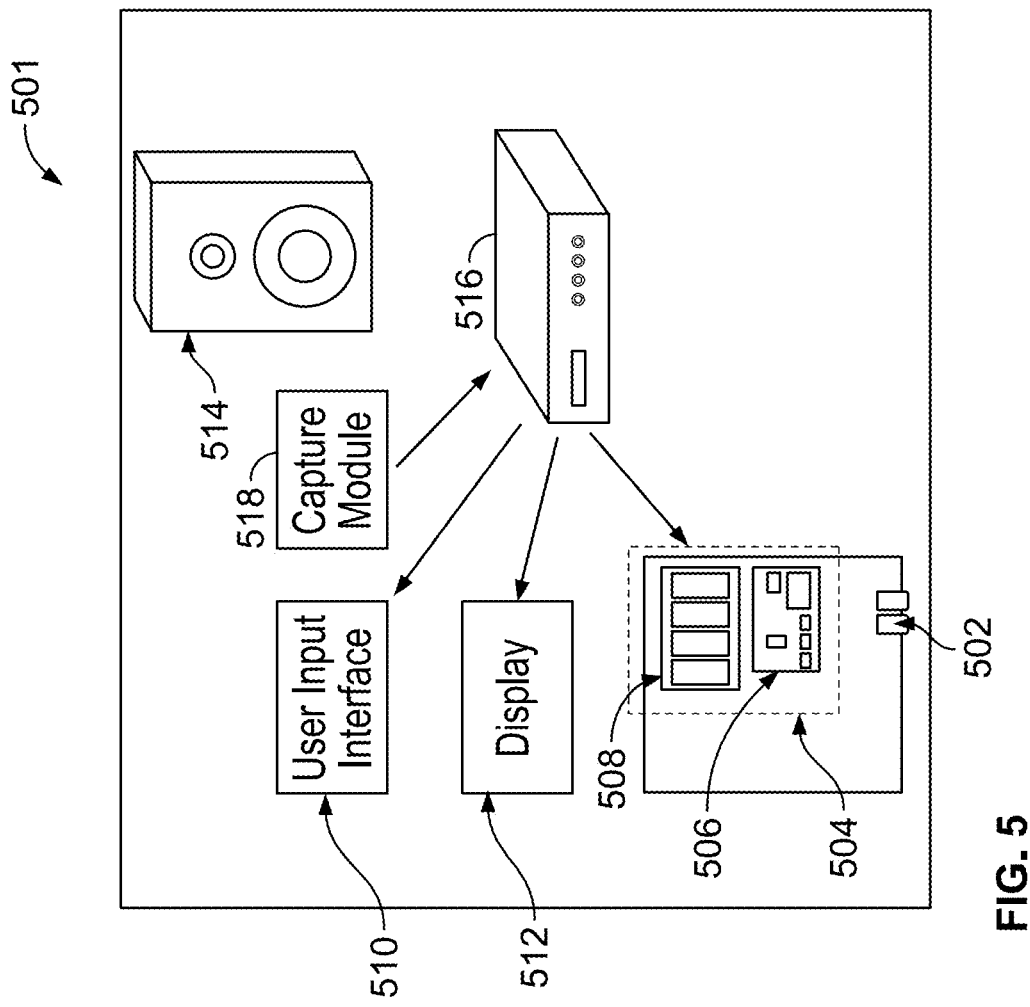
FIG. 5
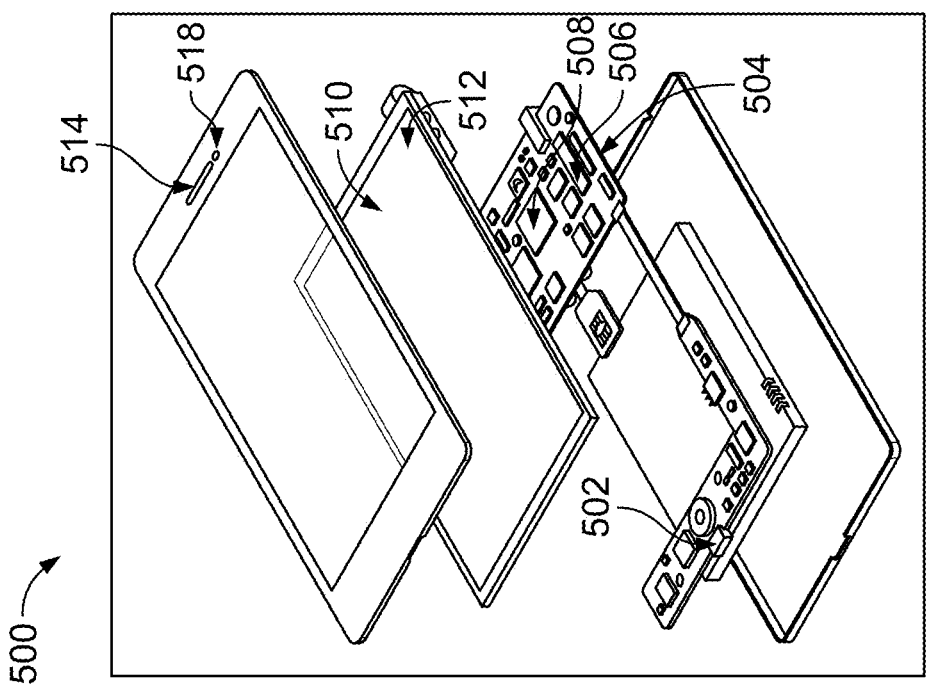

FIG. 6(A)

The Dark Knight — 602

| Characteristic | Score |
|---|---|
| Size | 4 |
| Color | 8 |
| Ambient Light | 8 |
| Texture | 2 |

FIG. 6(B)

Fortnite — 620

| Characteristic | Score |
|---|---|
| Size | 10 |
| Color | 8 |
| Ambient Light | 8 |
| Intensity | 3 |

FIG. 7(A)

Candidate Area 1 — 702

| Characteristic | Score |
|---|---|
| Size | 8 |
| Color | 9 |
| Ambient Light | 7 |
| Texture | 6 |

FIG. 7(B)

Candidate Area 2 — 720

| Characteristic | Score |
|---|---|
| Size | 6 |
| Color | 4 |
| Ambient Light | 1 |
| Intensity | 5 |

| Quality of Projection Indicator for The Dark Knight ||
|---|---|
| Candidate Area 1 | 32+72+63+12 = 179 |
| Candidate Area 2 | 24+32+9+10 = 75 |
| Candidate Area 3 | 8+16+45+2 = 71 |

FIG. 8(A)

| Quality of Projection Indicator for Fortnite ||
|---|---|
| Candidate Area 1 | 80+72+56+18 = 226 |
| Candidate Area 2 | 60+32+8+15+27 = 142 |
| Candidate Area 3 | 10+16+24+27+50 = 117 |
| Candidate Area 4 | 40+24+8+42 = 114 |

FIG. 8(B)

SYSTEMS AND METHODS FOR MEDIA PROJECTION SURFACE SELECTION

BACKGROUND

The present disclosure is directed to media projection, and more particularly to selecting an area to project media content thereon.

SUMMARY

Users have long used a projection device to project a movie on to a projection screen. The requirement of having a projection screen installed, however, may be taxing in terms of space requirements, mobility, and cost. Users may, for example, wish to consume and share media content in a variety of locations including the office, during transit, or while visiting their friends who may not have a projection screen suitable for projecting the media content thereon. The availability of portable devices capable of playing media content, such as cell phones and tablets, have alleviated some of the mobility concerns. The small screens of such devices, however, often provide a subpar viewing experience.

To address the above concerns, systems and methods are disclosed herein for selecting a target area on which content is projected by analyzing the display conditions of a plurality of candidate areas and the visual characteristics for the content to be projected. Specifically, the systems and methods provided below identify a plurality of candidate areas, automatically determine display conditions of each of the candidate areas, determine visual characteristics of the content to be projected, and select a target area on which to project the content to enhance the viewing experience for the user.

For example, suitable control circuitry of a projection device, such as the control circuitry of a projector-equipped tablet or cell phone, receives content to be projected on a target area. The control circuitry also receives content attributes. The content attributes may include, for example, information on size, texture, color, reflectivity, intensity, and/or amount of ambient light that would result in an improved viewing experience. The control circuitry assigns a score to each of the content attributes based on importance of the content attribute to the viewing experience for the content. In some embodiments, the content attribute score is extracted from content metadata.

The control circuitry, via a capture module, captures an image of candidate areas for projecting the content within the environment of the projection device, and uses the captured images to determine display conditions of the candidate area. Specifically, the control circuitry analyzes the captured images to determine a number of candidate area characteristics such as size, texture, color, reflectivity, intensity, and/or amount of ambient light. The control circuitry determines a score for each of the candidate area characteristics by, for example, accessing a database storing scores corresponding to the size, texture, color, reflectivity, intensity, and/or amount of ambient light on the candidate areas.

The control circuitry generates a respective quality-of-projection indicator based on the scores assigned to content attributes and the candidate area characteristics. Specifically, the quality-of-projection indicator is generated by multiplying the scores assigned to content attributes by the corresponding candidate area characteristics. The control circuitry selects the candidate area with the highest quality-of-projection indicator as the target area on which the content is to be projected.

In some embodiments, the control circuitry of the projection device is configured to identify candidate areas in conjunction with the movement of the projection device. Specifically, the control circuitry uses a capture module to identify potential candidate areas upon detecting that the projection device has been repositioned from a first area to a second area.

The control circuitry also accounts for the time of day and the duration for which the content is to be projected in determining the display condition for the candidate areas. Specifically, the control circuitry predicts a change in the candidate area characteristics by analyzing the captured image. The control circuitry may also obtain weather information for the time of the day, and, based on the captured image, predicts a change in amount of ambient light on the candidate areas.

The content attributes may also include information for acoustics that would result in an improved viewing experience. A first score is assigned to the content attribute for the acoustics based on extracted content metadata. The control circuitry further determines candidate area acoustic characteristics and assigns a second score to the candidate areas. The control circuitry calculates a respective quality-of-sound score for the candidate areas by adding the first and second scores. The quality-of-projection indicator for the candidate areas is adjusted based on the corresponding quality-of-sound score.

BRIEF DESCRIPTION OF THE DRAWINGS

The above and other objects and advantages of the disclosure will be apparent upon consideration of the following detailed description, taken in conjunction with the accompanying drawings, in which reference characters refer to like parts throughout, and in which:

FIG. 4 is a flowchart of illustrative steps for generating a quality-of-projection indicator for candidate areas in accordance with some aspects of the disclosure.

FIG. 5 is a block diagram of an illustrative projection device in accordance with some embodiments of the disclosure.

FIGS. 6A and 6B show illustrative data structures storing content attributes in accordance with some embodiments of the disclosure.

FIGS. 7A and 7B show illustrative data structures storing candidate area characteristics in accordance with some embodiments of the disclosure.

FIGS. 8A and 8B show illustrative data structures storing quality-of-projection indicators for the candidate areas and different content in accordance with some embodiments of the disclosure.

DETAILED DESCRIPTION

Figure 1:
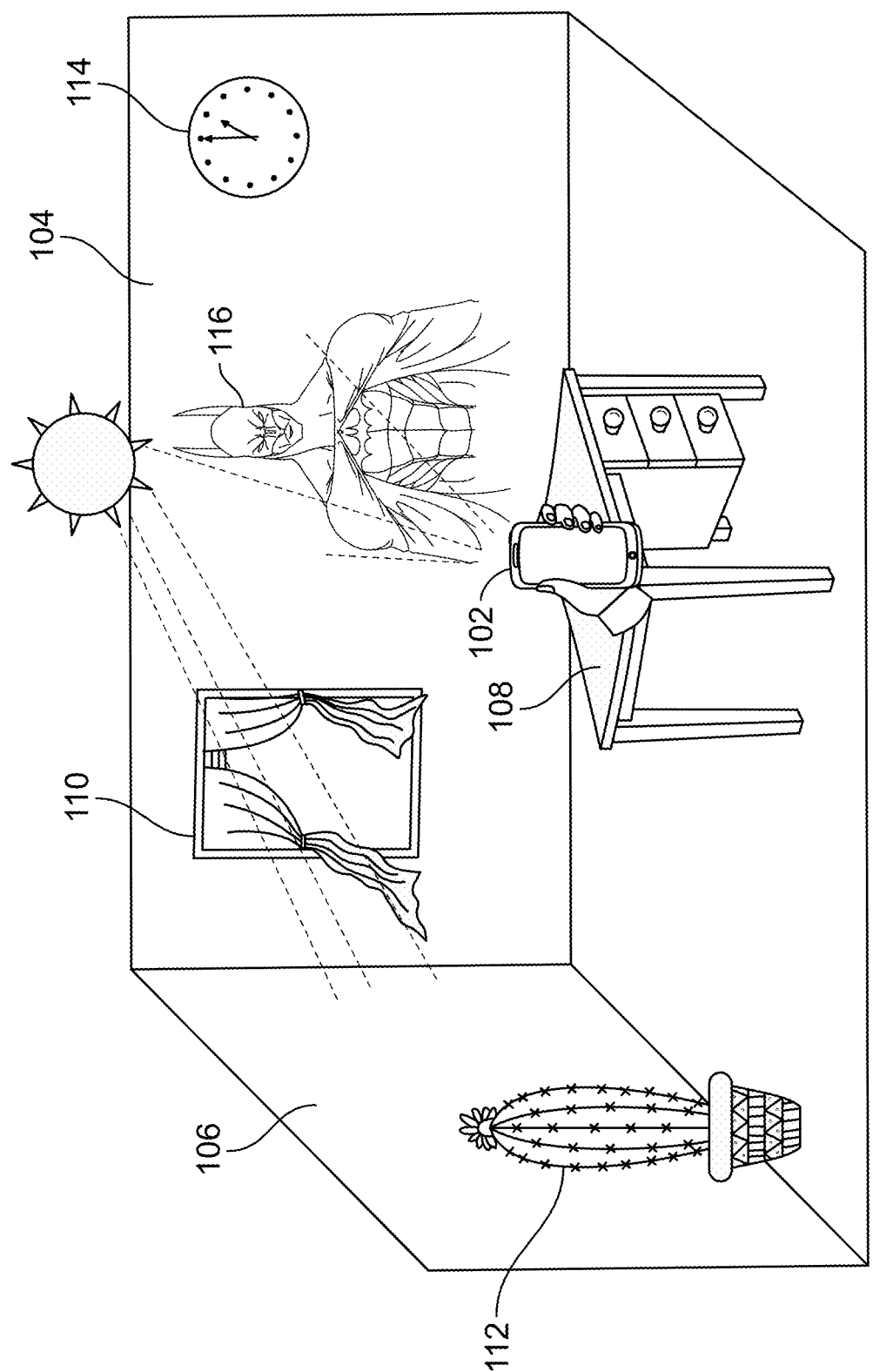
FIG. 1 shows an illustrative example of a projection device automatically selecting a target area and projecting content thereon.
Figure 2:
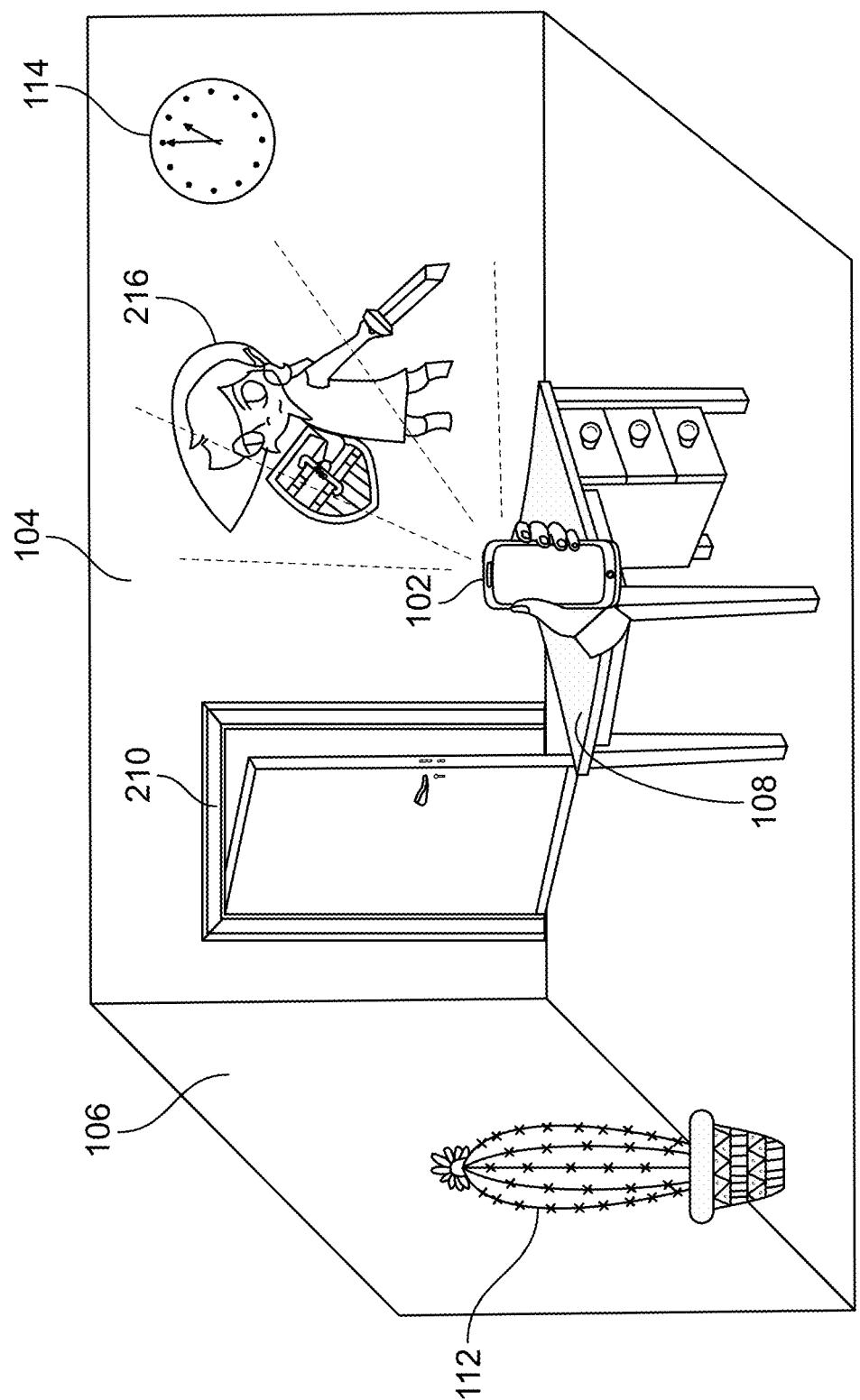
FIG. 2 shows another illustrative example of a projection device automatically selecting a target area and projecting content thereon.

FIGS. 1 and 2 illustrate an example of projection device 102, such as a projector-equipped tablet or cell phone, having a suitable control circuitry 504 (discussed below in more detail with reference to FIG. 5) configured to automatically select a target area to project media content thereon. Projection device 102 receives content to be projected on a target area. For example, as illustrated in FIG. 1, a user of the projection device 102 may wish to project the movie "The Dark Knight" for viewing. Projection device 102 receives the movie "The Dark Knight" to be projected on the target area. In another example, as illustrated in FIG. 2, the user may wish to play the video game "Fortnite" by projecting the characters from the game on the target area. Projection device 102 receives the content for the game "Fortnite" to be projected on the target area. In some embodiments, control circuitry 504 may retrieve the media content from a memory storage 508 of the projection device 102.

Control circuitry 504 receives content attributes for the content (e.g., "The Dark Knight" or the video game "Fortnite"). The content attributes may be extracted from content metadata or from external sources. For example, control circuitry 504 may extract content attributes from social media message boards, such as IMDB, discussing the content. The content attributes may include information for one or more of size, texture, color, reflectivity, intensity, and/or amount of ambient light that would result in an improved viewing experience (described below in more detail with reference to FIG. 4). For example, the content attributes for the movie "The Dark Knight" may be collected from social media message boards discussing the preferred viewing conditions for viewing the movie "The Dark Knight" in homes. In this instance, control circuitry 504 may determine, from the content attributes, that the movie-viewing experience is improved by watching the movie in a room that does not receive a lot of ambient light. In the example illustrated in FIG. 2, control circuitry 504 may determine, from the content attributes of the video game "Fortnite," that the game play experience is improved by projecting the video game on an area that is at least 50" in width and 30" in height.

Control circuitry 504 of projection device 102 assigns a score to each of the content attributes (discussed below in more detail with reference to FIG. 6). In some embodiments, control circuitry 504 of projection device 102 assigns a respective score between 1 and 10 to each of the content attributes. For example, control circuitry 504 may determine, from the content attributes for the movie "The Dark Knight," that the movie-viewing experience is improved by watching the movie in a room which does not receive a lot of ambient light and assign a content attribute score of 8. In another example, control circuitry 504 may determine that the texture of the area on which the movie is projected does not impact the viewing experience and assign a low score such as a 2 on a scale from 1 to 10.

Control circuitry 504, via a capture module 518 (discussed below in more detail with reference to FIG. 5), captures an image of the candidate areas 104, 106, 108 (described below in more detail with reference to FIG. 14). Control circuitry 504 of projection device 102 is configured to use data captured by capture module 518 to determine respective display conditions of candidate areas 104, 106, 108 in the environment surrounding projection device 102. For example, projection device 102 determines, using the data captured by capture module 518, the presence of plant 112 or clock 114 as shown in FIGS. 1 and 2, which impact the available viewing region in the respective candidate areas 106 and 104.

Control circuitry 504 of projection device 102 further determines candidate area characteristics based on the captured images. Specifically, control circuitry 504 analyzes the captured images to determine candidate area characteristics such as size, texture, color, reflectivity, intensity, and/or amount of ambient light for the candidate areas. For example, control circuitry 504 of projection device 102 analyzes an image captured by a color camera of capture module 518 of walls 104, 106 within the office to determine their respective colors (discussed in more detail below with reference to FIG. 9). In another example, control circuitry 504 of projection device 102 analyzes the images captured by capture module to determine the amount of ambient light that falls on walls 104 and 106 (discussed in more detail below with reference to FIG. 10). In some embodiments, control circuitry 504 accounts for the time of day and the duration for which the content is to be projected in determining the candidate area characteristics (discussed in more detail below with reference to FIG. 11).

Control circuitry 504 of projection device 102 assigns a score for each of the candidate area characteristics (discussed below in more detail with reference to FIG. 7). Specifically, control circuitry 504 of projection device 102 assigns a score between 1 and 10 to each of the candidate area characteristics. For example, control circuitry 504 assigns a score of 3 to a wall 106 that has been painted blue and assigns a score of 10 to a wall 104 that has been painted white. In another example where the user wishes to project content at 4:00 PM, control circuitry 504 assigns a score of 1 for the candidate area characteristic related to ambient light to wall 106, which receives direct sunlight through window 110, and assigns a score of 7 to another wall 104 in the office which is not exposed to direct sunlight. However, in an example where the user wishes to project content at 9:00 PM, control circuitry 504 assigns the same score of 9 for the candidate area characteristic related to ambient light to both walls 104 and 106.

Control circuitry 504 generates a respective quality-of-projection indicator based on the visual characteristics for the content, to the display conditions of each of the plurality of candidate areas. Specifically, control circuitry 504 generates the quality-of-projection indicator by multiplying the scores assigned to content attributes by the corresponding candidate area characteristics. For example, control circuitry 504 generates the quality-of-projection indicator for wall 104 based on the candidate area characteristic scores assigned to wall 104 and the content attribute scores assigned to the movie. An example method for computing the quality-of-projection indicator for the candidate areas is discussed in greater detail below with reference to FIGS. 4 and 6-8.

In some embodiments, control circuitry 504 generates the respective quality-of-projection indicator for each of the plurality of candidate areas and selects the candidate area with the highest quality-of-projection indicator as the target area on which the content is to be projected. For example, when the user wishes to project the video game "Fortnite" at 4:00 PM, control circuitry 504 of projection device 102 selects wall 104 based on the higher quality-of-projection indicator.

Control circuitry 504 of projection device 102 is further configured to identify candidate areas in conjunction with the movement of projection device 102. For example, when projection device 102 is moved from an office to a conference room, control circuitry 504 captures images of the various candidate areas within the conference room to identify and select a target area from the identified candidate areas. In another example, the user may leave the office and take a taxi home but wish to continue watching a movie on his transit home. In such an instance, control circuitry 504 identifies candidate areas such as the back of the driver's seat where the user is sitting in the backseat, using capture module 518.

In some embodiments, control circuitry 504 adjusts the respective quality-of-projection indicator based on the acoustics characteristics of the content and the candidate areas. Specifically, control circuitry 504 also extracts information for acoustics from the content attributes that would result in an improved viewing experience. For example, control circuitry 504 for the projection device may determine that the movie "The Dark Knight" has a significant amount of dialogue that gets drowned out with minimal ambient noise. Control circuitry 504 further determines candidate area acoustic characteristics (e.g., for walls 104 and 106). For example, control circuitry 504 may determine that a wall 104 in an office next to the door 210 has poor acoustic performance because of ambient sound coming in from the outside, whereas a wall 106 away from the door and any windows has better acoustic performance.

Control circuitry 504 calculates a respective quality-of-sound score for the candidate areas based on the content attributes for acoustics and the candidate area acoustic characteristics. The quality-of-projection indicator for the candidate areas is adjusted based on the corresponding quality-of-sound score. An example method for computing a quality-of-sound score corresponding to each of the plurality of candidate areas is discussed in greater detail below with reference to FIGS. 12 and 13.

In some embodiments, control circuitry 504 determines a curvature of each of the plurality of candidate areas to identify and select a target area on which to project the content. For example, control circuitry 504 determines the curvature of the candidate areas (e.g., walls 104 and 106) and give a preference to a candidate area with a lower curvature value while disfavoring candidate areas with higher curvature values. An example method for computing a curvature for each of the candidate areas is discussed in greater detail below with reference to FIG. 15.

As referred to herein, the term "projection device" is a device that may receive and store, in a memory 508, content to be projected on a target area, and that is configured to project content on the target area. For example, projection device 102 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a wearable device, a portable video player, a portable music player, a portable gaming machine, a smartphone, or any other television equipment, computing equipment, or wireless device, and/or combination of the same. In some embodiments, the projection device may have a front-facing screen and a rear-facing screen, multiple front screens, or multiple angled screens. In some embodiments, the projection device may have a front facing camera and/or a rear facing camera. On these projection devices, users may be able to navigate among and locate the same content available through a television. Additional structural details of the projection device are discussed below with reference to FIG. 5.

As referred to herein, the term "content" should be understood to mean an electronically consumable media asset, such as television programming, as well as pay-per-view programs, on-demand programs (such as video-on-demand (VOD) systems), Internet content (e.g., streaming content, downloadable content, Webcasts, etc.), video clips, audio clips, content information, pictures, rotating images, documents, playlists, websites, articles, books, electronic books, advertisements, blogs, chat sessions, social media applications, video games, and/or any other media or multimedia and/or combination of the same. As referred to herein, the term "multimedia" should be understood to mean content that uses at least two different content forms described above, for example, text, audio, video, images, or interactivity content forms. Content may be recorded, played, displayed, or accesses by projection devices, but can also be part of a live performance.

Figure 3:
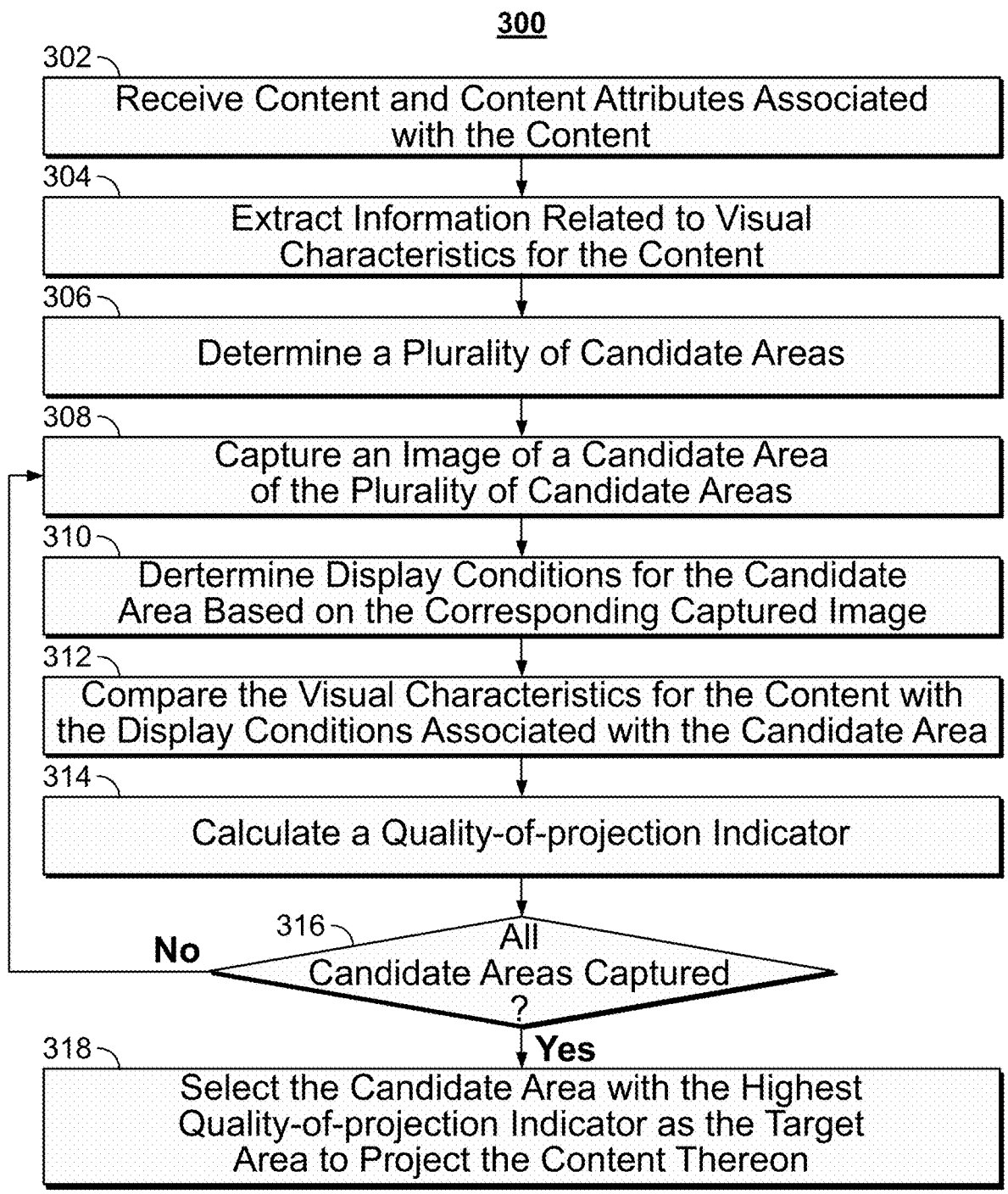
FIG. 3 is a flowchart of illustrative steps for selecting a target area for projecting the content thereon in accordance with some aspects of the disclosure.

FIG. 3 is an embodiment of a process 300 for selecting a target area on which to project content from a plurality of candidate areas. It should be noted that each step of process 300 can be performed by control circuitry 504. Control circuitry 504 may be part of the projection device (e.g., a projector-equipped tablet or phone), or of a remote server separated from the projection device by way of communication network 514, or distributed over a combination of both.

At step 302, control circuitry 504 receives a content to be projected along with content attributes. For example, control circuitry 504 may retrieve content (e.g., a movie) from a storage 508 of projection device 102. In some embodiments, control circuitry 504 may use an I/O path 502 to retrieve content attributes from content metadata from a remote data source such as a cloud storage. In some embodiments, control circuitry 504 may scrape social media message boards that include discussion of the received content (e.g., information related to how dark the movie is and/or whether the audio is too muted to hear in a room with lots of ambient sound) to retrieve content attributes. In some embodiments, an additional service may exist and control circuitry 504 may communicate with the additional service to obtain the content metadata remotely.

At step 304, control circuitry 504 extracts information related to visual characteristics for the content. Specifically, control circuitry 504 extracts information from the content attributes such as one or more of size, texture, color, reflectivity, intensity, and/or amount of ambient light that would result in an improved viewing experience. For example, content attributes for the movie "The Dark Knight" may be collected from social media message boards discussing the preferred viewing conditions. In this instance, control circuitry 504 may determine, from the content attributes, that the movie-viewing experience is improved by watching the movie in a room that does not receive a lot of ambient light.

At step 306, control circuitry 504 uses capture module 518 to identify a plurality of candidate areas on which the content may potentially be projected. For example, control circuitry 504 may prompt a user to capture an image of each area available (e.g., walls 104 and 106, and the desk 108) in the user's immediate surroundings on which the content may be projected. In another example, the control circuitry may instruct a rotating capture module 518 to capture images of an environment of projection device 102. As illustrated in FIGS. 1 and 2, control circuitry 504 may identify walls 104 and 106, and desk surface 108 as the candidate areas. A person skilled in the art will recognize that any number of candidate areas may be determined as suitable areas on which content may be projected, including a smoke screen. At step 308, control circuitry 504 uses capture module 518 to capture an image of a candidate area of the plurality of determined candidate areas. For example, control circuitry 504 uses capture module 518 of projection device 102 (e.g., a camera on the phone 102) to capture an image of walls 104 and 106.

At step 310, control circuitry 504 determines display conditions for the candidate area based on the corresponding captured image. Specifically, control circuitry 504 determines respective candidate area characteristics based on the captured respective image for each of the plurality of candidate areas. For example, control circuitry 504 identifies the color of walls 104 and 106 based on the color image captured by a color camera of capture module 518. In another example, control circuitry 504 identifies the amount of ambient light that walls 104 and 106 are exposed to by analyzing the image captured by capture module 518.

At step 312, control circuitry 504 generates a respective quality-of-projection indicator based on the content attributes and the corresponding candidate area characteristics. For example, control circuitry 504 compares a score assigned to a candidate area for amount of ambient light the area receives with a score assigned to the content attribute indicating the importance of the amount of ambient light. For example, when the user wishes to project the video game "Fortnite" at 4:00 PM, control circuitry 504 of projection device 102 may determine, based on the content attributes, that it is important for game play that the game be projected in an area with a low amount of ambient light. Control circuitry 504 may further determine, based on an analysis of the captured images of the various candidate areas within the office, that wall 106 receives direct sunlight from window 110 while wall 104 in the office is not exposed to direct sunlight.

At step 314, control circuitry 504 calculates a quality-of-projection indicator for the candidate area based on the content attributes and the corresponding candidate area characteristics. The specific mechanism for calculating the quality-of-projection indicator is described in greater detail below with reference to FIG. 4 below. At step 316, control circuitry 504 determines whether a respective quality-of-projection indicator has been calculated for all the candidate areas. If control circuitry 504 determines that a respective quality-of-projection indicator has not been calculated for all the candidate areas, the process returns to step 308, where control circuitry 504 instructs capture module 518 to capture an image of a candidate area whose quality-of-projection indicator has not be calculated. If, at step 316, control circuitry 504 determines that a respective quality-of-projection indicator has been calculated for each of the candidate areas, the process proceeds to step 318.

At step 318, control circuitry 504 compares the quality-of-projection indicator for the candidate areas to select the candidate area with the highest quality-of-projection indicator as the target area on which to project the content. For example, control circuitry 504 may select wall 104 as the target area when it determines that a quality-of-projection indicator of wall 104 is higher than a quality-of-projection indicator of wall 106 and the desk surface 108. Control circuitry 504 then projects the content on the selected target area.

It should be noted that this embodiment can be combined with any other embodiment in this description and that process 300 is not limited to the devices or control components used to illustrate process 300 in this embodiment.

FIG. 4 is an embodiment of a process 400 for calculating a quality-of-projection indicator for a plurality of candidate areas in accordance with some aspects of the disclosure. It should be noted that each step of process 400 can be performed by control circuitry 504. Control circuitry 504 may be part of projection device 102 (e.g., a projector-equipped tablet or phone), or of a remote server separated from projection device 102 or distributed over a combination of both. Process 400 expands on steps 308-314 of process 300. At step 402, control circuitry 504 uses capture module 518 to capture an image of the candidate areas. For example, control circuitry 504 uses capture module 518 of projection device 102 (e.g., a camera on a phone) to capture an image of walls 104 and 106.

At step 404, control circuitry 504 analyzes the captured image to determine one or more candidate area characteristics. For example, control circuitry 504 determines one or more candidate area characteristics such as a size of the available region for projection on the candidate area (e.g., wall 104 has a larger area available for projection than the surface 108 on the desk), texture of the candidate area, color of the candidate area, reflectivity of the candidate area, intensity of the candidate area, and amount of ambient light that the candidate area is exposed to. For example, control circuitry 504 may determine that wall 104 has an available area of 30" in height and 50" in width, is painted white, has a smooth texture, and is not exposed to direct sunlight.

At step 406, control circuitry 504 assigns a respective score to each of the determined candidate area characteristics. For example, control circuitry 504 of projection device 102 assigns a score between 1 and 10 to each of the determined candidate area characteristics. In some embodiments, content circuitry 504 may access a database storing scores corresponding to different ranges of candidate area characteristics and retrieve a score corresponding to a candidate area characteristic matching the determined candidate area characteristic. For example, control circuitry 504 may assign a score of 3 to wall 106 that has been painted blue and assign a score of 10 to a wall 104 that has been painted white. In another example where the user wishes to project a media content at 4:00 PM, control circuitry 504 may assign a score of 1 for the candidate area characteristic for ambient light to wall 106 which receives direct sunlight through window 110 and assign a score of 7 to another wall 104 in the office which is not exposed to direct sunlight.

At step 408, control circuitry 504 extracts one or more content attributes. For example, control circuitry 504 extracts content attributes such as one or more of size, texture, color, reflectivity, intensity, and/or amount of ambient light that would result in an improved viewing experience. For example, content attributes for the movie "The Dark Knight" may be collected from social media message boards discussing the preferred viewing conditions for watching the movie.

At step 410, control circuitry 504 of projection device 102 assigns a respective score to each of the content attributes. In some embodiments, control circuitry 504 of projection device 102 assigns a respective score between 1 and 10 to each of the content attributes. For example, control circuitry 504 may determine, from the content attributes of the movie "The Dark Knight," that the movie-viewing experience is improved by watching the movie in a room that does not receive a lot of ambient light and assign a score of 9 for amount of ambient light. In another example, control circuitry 504, based on content attributes, may determine that the texture of the area on which the movie is projected does not impact the viewing experience and assign a low score such as a 2 on a scale from 1 to 10.

At step 412, control circuitry 504 multiplies the scores assigned to each of the content attributes to the scores assigned to each of the corresponding candidate area characteristics to calculate a respective combined characteristic score. For example, when the user wishes to project the video game "Fortnite" at 4:00 PM, control circuitry 504 of the projection device may, for the first wall 106 opposite a window 110 (i.e., one of the candidate areas), multiply its assigned candidate area characteristics score of 1 by the corresponding content attribute score of 8 to obtain a combined characteristic score of 8. Similarly, control circuitry 504 of projection device 102 may, for wall 104 (i.e., one receiving less sunlight), multiply its assigned candidate area characteristic score of 7 by the corresponding content attribute score of 8 to obtain a combined characteristic score of 56. Control circuitry 504 similarly calculates combined characteristic scores for one or more of size, texture, color, reflectivity, intensity, and/or amount of ambient light assigned to each of the content attributes and each of the candidate area characteristics.

At step 414, control circuitry 504 generates the respective quality-of-projection indicator by adding the combined characteristic scores and selects the candidate area with the highest quality-of-projection indicator as the target area on which the content is to be projected. For example, when the user wishes to project the video game "Fortnite" at 4:00 PM, control circuitry 504 of projection device 102 selects wall 104 based on the higher quality-of-projection indicator assigned to it.

It should be noted that this embodiment can be combined with any other embodiment in this description and that process 400 is not limited to devices or control components used to illustrate process 400 in this embodiment.

Users may access content and the application from one or more of their media devices, i.e., user equipment. FIG. 5 shows generalized embodiments of an illustrative device, i.e., projection device 102. For example, projection device 102 may be a smartphone device, a tablet, or a remote control, such as illustrative user equipment 500. In another example, projection device 102 may be a user equipment system 501. User equipment system 501 may include a set-top box 516. Set-top box 516 may be communicatively connected to speaker 514 and display 512. In some embodiments, set-top box 516 may be communicatively coupled to user interface input 510. In some embodiments, user interface input 510 may be a remote control device. Set-top box 516 may include one or more circuitry boards. In some embodiments, the circuit boards may include processing circuitry, control circuitry, and storage (e.g., RAM, ROM, Hard Disk, Removable Disk, etc.). In some embodiments, circuit boards may include an input/output path. Each one of user equipment device 500 and user equipment system 501 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processor or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for an application stored in memory (e.g., memory 508). Specifically, control circuitry 504 may be instructed by the application to perform the functions discussed above and below. For example, the application may provide instructions to control circuitry 504 to automatically select the target area to project media content thereon. In some implementations, any action performed by control circuitry 504 may be based on instructions received from the application.

In client-server based embodiments, control circuitry 504 may include communications circuitry suitable for communication with an application server or other networks or servers. The instructions for carrying out the above-mentioned functionality may be stored on the application server. Communications circuitry may include a cable modem, an integrated service digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications network or paths. In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 208 may be used to store various types of content described herein as well as media guidance data described above. Nonvolatile memory may also be used (e.g., to launch a boot-up routine and other instructions). Cloud-based storage may be used to supplement storage 508 or instead of storage 508.

Control circuitry 504 may include video generating circuitry and tuning circuitry, such as the one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scalar circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scalar, and analog/digital circuitry may be implemented using software running one or more general purpose or specialized processors. Multiple tuners may also be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be of storage 508.

A user may send instructions to control circuitry 504 using user input interface 510. User input interface 510 may be any suitable user input interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment system 501. For example, display 512 may be a touchscreen or touch-sensitive display. In such circumstances, user input interface 510 may be integrated with or combined with display 512. Display 512 may be one or more of a monitor, a television, a liquid-crystal display (LCD) for a mobile device, amorphous silicon display, low temperature poly silicon display, electronic ink display, electrophoretic display, active matrix display, electro-wetting display, electrofluidic display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with control circuitry 504. Speakers 514 may be provided as integrated with other elements of each one of user equipment device 500 and user equipment system 501 or may be stand-alone units. The audio component of videos and other content displayed on display 512 may be played through speakers 514. In some embodiments, the audio may be distributed to a receiver (not shown), which processes and outputs the audio via speakers 514. A capture module 518 may be provided as integrated with the other elements of each one of user equipment device 500 and user equipment system 501 or may be a stand-alone unit. Capture module 518 includes a color camera and a depth camera and is configured to capture one or more images of the plurality of candidate areas.

The application may be implemented using any suitable architecture. For example, it may be a stand-alone application wholly-implemented on each one of user equipment device 500 and user equipment system 501. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may receive instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the application is a client-server based application. Data for use by a thick or thin client implemented on each one of a user equipment device 500 and user equipment system 501 is retrieved on-demand by issuing requests to a server remote to each one of user equipment device 500 and user equipment system 501. In one example of a client-server based application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on user equipment device 500. This way, the processing of the instructions is performed remotely by the server while the resulting displays are provided locally on user equipment device 500. Equipment device 500 may receive inputs from the user via input interface 510 and transmit those inputs to the remote server for processing and generating the corresponding displays. For example, equipment device 200 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 200 for presentation to the user.

In some embodiments, the application is downloaded and interpreted or otherwise run by an interpreter or virtual machine (run by control circuitry 504). In some embodiments, the application may be encoded in the ETV Binary Interchange Format (EBIF), received by control circuitry 504 as part of a suitable feed, and interpreted by a user agent running on control circuitry 504. For example, the application may be an EBIF application. In some embodiments, the application may be defined by a series of JAVA-based files that are received and run by a local virtual machine or other suitable middleware executed by control circuitry 504. In some of such embodiments (e.g., those employing MPEG-2 or other digital media encoding schemes), the application may be, for example, encoded and transmitted in an MPEG-2 object carousel with the MPEG audio and video packets of a program.

FIGS. 6A and 6B show illustrative data structures storing content attributes in accordance with some embodiments of the disclosure. Specifically, FIG. 6A illustrates a data structure 602 corresponding to the movie "The Dark Knight" which stores content attributes 604, 606, 608, 610 and a corresponding score 612, 614, 616, 618 indicating the importance of the content attribute. For example, control circuitry 504 determines, from content metadata (e.g., associated movie metadata), that the size of the area on which the content is projected is not critically important and is therefore assigned a score of 4. Control circuitry 504 further determines, from the content metadata (e.g., associated movie metadata), that the amount of ambient light on the area on which the movie is projected is very important (e.g., because the movie includes a lot of dark frames which makes it difficult to watch when projected on a bright area) and is therefore assigned a score of 9.

Similarly, FIG. 6B illustrates a data structure 620 corresponding to the video game "Fortnite" which stores content attributes 622, 624, 626, 628 and corresponding scores 630, 632, 634, 636 indicating the importance of each of the content attributes. For example, control circuitry 504 determines, from the video game metadata (e.g., based on comments discussing the video game on social media message boards), that the size of the area on which the game is projected is critically important and is therefore assigned a score of 10. Control circuitry 504 further determines, from the video game metadata, that it is important to minimize the amount of ambient light on the area on which the video game is projected (e.g., because the video game includes a lot of dark frames such that the gameplay experience deteriorates in a well-lit area) and is therefore assigned a score of 8. A person possessing ordinary skill in the art will recognize that the scores provided above are merely examples, and any number of content attributes and/or suitable scoring mechanisms may be used to quantify the content attributes.

FIGS. 7A and 7B show illustrative data structures storing candidate area characteristics in accordance with some embodiments of the disclosure. Specifically, FIG. 7A illustrates a data structure 702 corresponding to a candidate area 1 (e.g., wall 104) which stores candidate area characteristics 704, 706, 708, 710 and a corresponding score 712, 714, 716, 718 assigned to the candidate area characteristics. For example, control circuitry 504 determines, based on an analysis of the respective captured image, that wall 104 has a relatively large area available for projection and is therefore assigned a score of 8. Control circuitry 504 further determines that wall 104 receives relatively little ambient light (e.g., because it does not receive direct sunlight from window 110) and is therefore assigned a score of 7.

Similarly, FIG. 7B illustrates a data structure 720 corresponding to a candidate area 2 (e.g., wall 106) which stores candidate area characteristics 722, 724, 726, 728 and a corresponding score 730, 732, 734, 736 assigned to the candidate area characteristics. For example, control circuitry 504 determines, based on an analysis of the respective captured image, that wall 106 has a relative smaller area available for projection and is therefore assigned a score of 6. Control circuitry 504 further determines that wall 104 receives direct sunlight from the window 110 and is therefore assigned a score of 1. A person possessing ordinary skill in the art will recognize that the scores provided above are merely examples, and any number of candidate area characteristics and/or suitable scoring mechanisms may be used to quantify candidate area characteristics.

FIGS. 8A and 8B show illustrative data structures storing quality-of-projection indicators for the candidate areas and different contents in accordance with some embodiments of the disclosure. Specifically, FIG. 8A illustrates a data structure 801 corresponding to a first content to be projected (e.g., "The Dark Knight") which includes a listing of the candidate areas 802, 804, 806 and a corresponding quality-of-projection indicator 808, 810, 812 assigned to the candidate area. For example, control circuitry 504 determines, based on the candidate area characteristics of wall 104 and the content attributes of the movie "The Dark Knight," that candidate area 1 (e.g., wall 104) has a quality-of-projection score of 179. Control circuitry 504 further determines that candidate area 3 (e.g., desk surface 108) has a quality-of-projection score of 71.

Similarly, FIG. 8B illustrates a data structure 803 corresponding to a second content to be projected (e.g., "Fortnite") which includes a listing of the candidate areas 814, 816, 818, 820 and a corresponding quality-of-projection indicator 808, 810, 812 assigned to the candidate areas. For example, control circuitry 504 determines, based on the candidate area characteristics of wall 106 and the content attributes of the movie "Fortnite," that candidate area 2 (e.g., wall 106) has a quality-of-projection score of 142. Control circuitry 504 further determines that candidate area 1 (e.g., wall 104) has a quality-of-projection score of 226.

Figure 9:
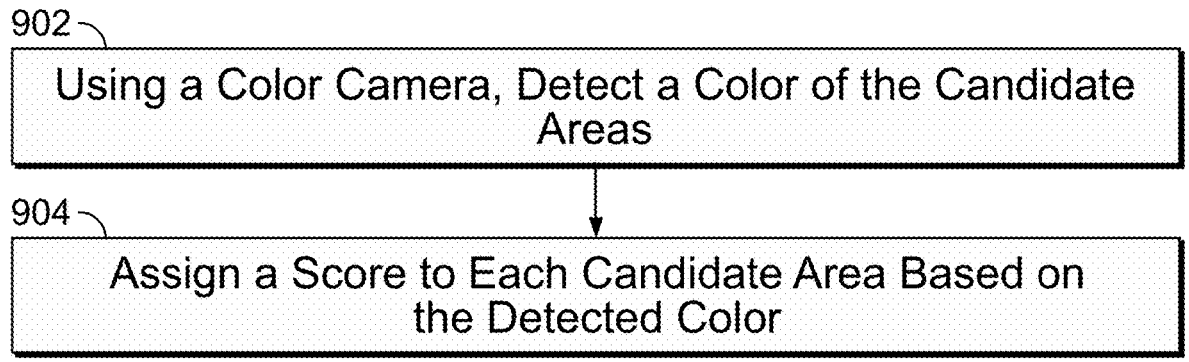
FIG. 9 is an illustrative flowchart for assigning a score for a candidate area characteristic in accordance with some embodiments of the disclosure.

FIG. 9 is an embodiment of a process 900 for assigning a score to each of the candidate areas based on their respective colors. It should be noted that each step of process 900 can be performed by control circuitry 504. Control circuitry 504 may be part of the projection device (e.g., a projector-equipped tablet or phone), or of a remote server separated from the projection device by way of communication network 514, or distributed over a combination of both. At step 902, control circuitry 504 may use a color camera (such as the color camera included in capture module 518) to capture an image of each of the candidate areas (e.g., walls 104, 106) to detect the color of the candidate areas. At step 904, control circuitry 504 assigns a score to each candidate area based on the detected color. For example, control circuitry 504 may assign a score of 1 to a wall painted blue and assign a score of 9 to a wall painted white. In some embodiments, control circuitry 504 accesses a database stored in the memory 508 which includes a score for a plurality of colors and control circuitry 504 retrieves a score corresponding to the detected color from the database.

It should be noted that this embodiment can be combined with any other embodiment in this description and that process 900 is not limited to the devices or control components used to illustrate process 900 in this embodiment.

Figure 10:
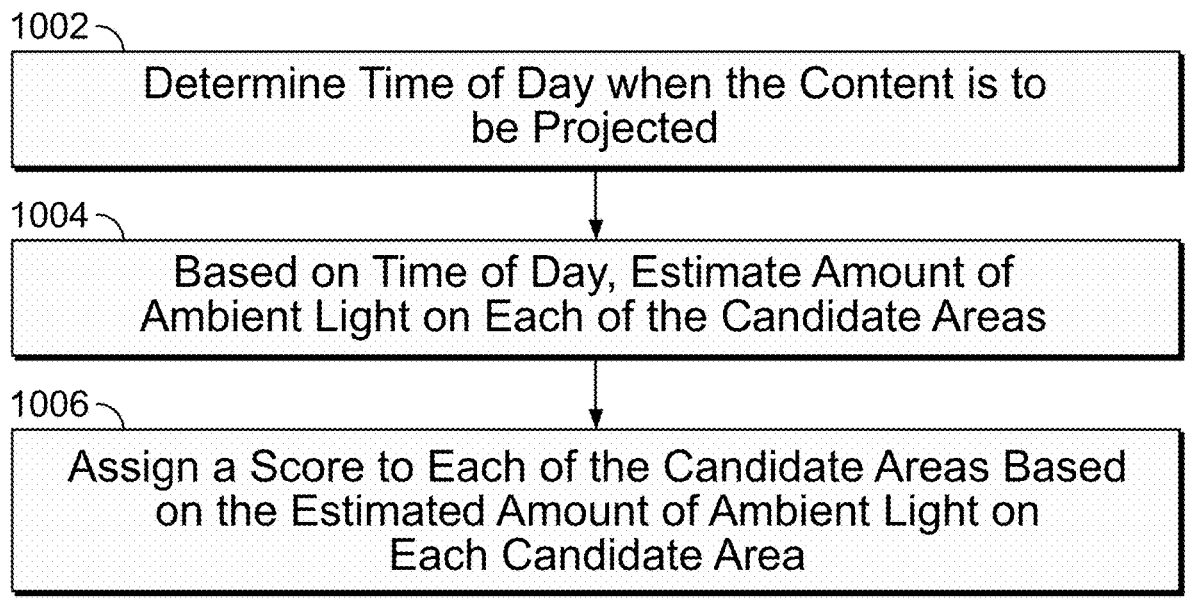
FIG. 10 is another illustrative flowchart for assigning a score for a candidate area characteristic in accordance with some embodiments of the disclosure.

FIG. 10 is an embodiment of a process 1000 for assigning a score to each of the candidate areas based on an estimated amount of ambient light the respective candidate areas are exposed to. It should be noted that each step of process 1000 can be performed by control circuitry 504. Control circuitry 504 may be part of the projection device (e.g., a projector-equipped tablet or phone), or of a remote server separated from the projection device by way of communication network 514, or distributed over a combination of both. At step 1002, control circuitry 504 determines a time of day when the user wishes to project the media content. For example, control circuitry 504 may determine the time at which the content is to be projected based on the time at which it receives a content selection input from a user.

At step 1004, control circuitry 504 estimates an amount of ambient light that each of the candidate areas is exposed to based on the time at which the content is to be projected. For example, in response to determining that the user wishes to project the content for viewing at 4:00 PM, control circuitry 504 determines that wall 106 would receive a substantial amount of sunlight through window 110. Similarly, in response to determining that the user wishes to project the content for viewing at 10:00 PM, control circuitry 504 estimates that wall 104 would receive more ambient light due to the open door 210.

At step 1006, control circuitry 504 assigns a score to the candidate areas (e.g., walls 104 and 106) based on the estimated amount of ambient light on each candidate area and the estimated time of day when the content is to be projected. For example, in response to determining that the user wishes to project the content for viewing at 4:00 PM, control circuitry 504 determines that wall 106 would receive a substantial amount of sunlight through window 110 and assigns wall 106 a score of 1. Similarly, in response to determining that the user wishes to project the content for viewing at 10:00 PM, control circuitry 504 estimates that wall 104 would receive more ambient light and assigns a score of 7 while assigning wall 106 a score of 9.

It should be noted that this embodiment can be combined with any other embodiment in this description and that process 1000 is not limited to the devices or control components used to illustrate process 1000 in this embodiment.

Figure 11:
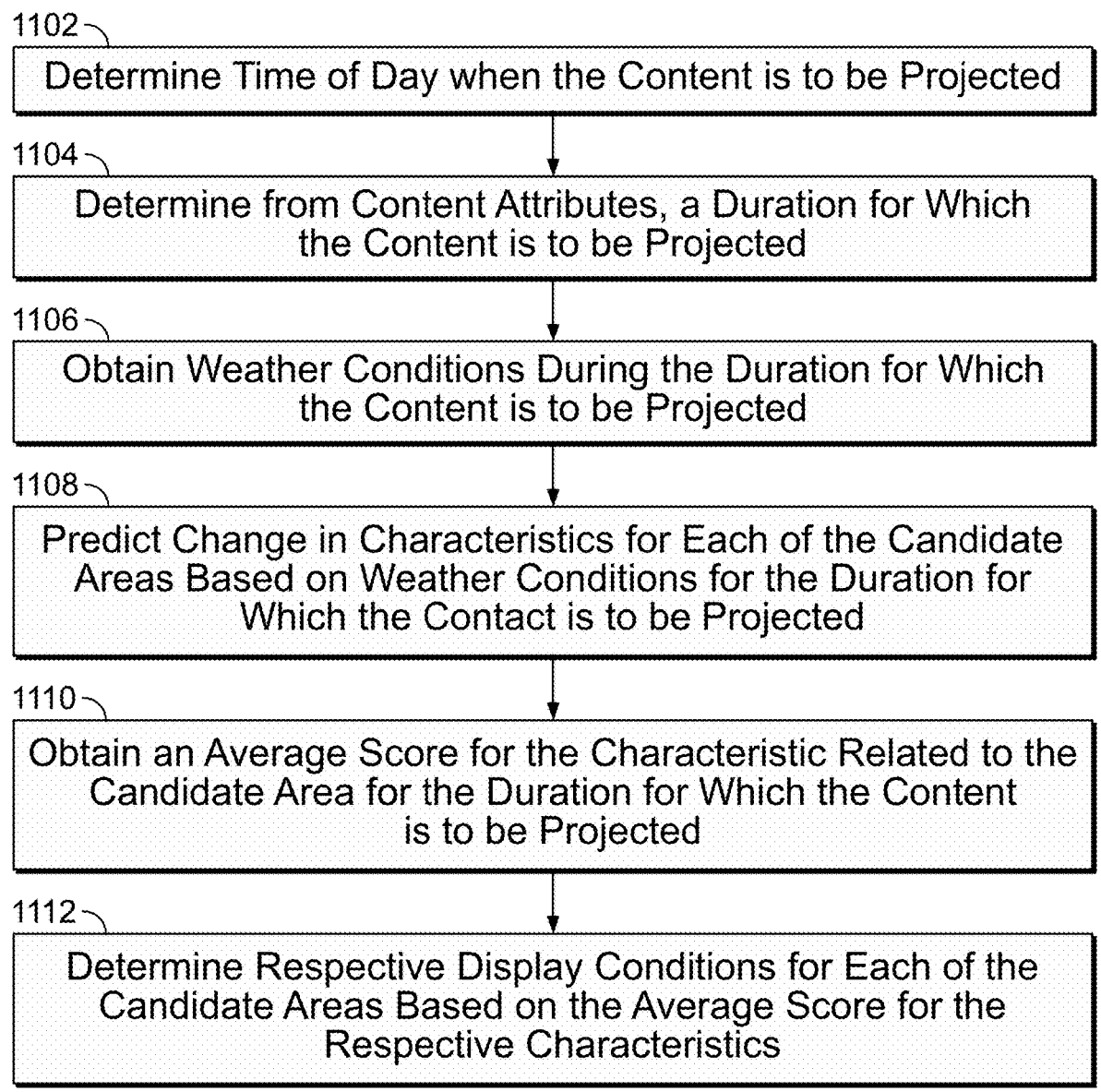
FIG. 11 is another flowchart of illustrative steps for accounting for change in weather conditions in determining candidate area characteristics in accordance with some embodiments of the disclosure.

FIG. 11 is an embodiment of a process 1100 for accounting for change in weather conditions in determining display conditions of each of a plurality of candidate areas. It should be noted that each step of process 1100 can be performed by control circuitry 504. Control circuitry 504 may be part of the projection device (e.g., a projector-equipped tablet or phone), or of a remote server separated from the projection device by way of communication network 514, or distributed over a combination of both. At step 1102, control circuitry 504 determines a time of day when the user wishes to project the media content. For example, control circuitry 504 may determine that the content is to be projected at 4:00 PM based on the time at which it receives a content selection input from a user.

At step 1104, control circuitry 504 determines, from content metadata, a duration for which the content is to be projected. For example, control circuitry 504 may determine, from content metadata, that the content has an estimated playtime of two hours. At step 1106, control circuitry 504 obtains weather conditions for the duration for which the content is to be projected. For example, control circuitry 504 obtains weather information for 4:00 PM through 6:00 PM when it determines that the content is to be projected at 4:00 PM and has an estimated runtime of two hours.

At step 1108, control circuitry 504 predicts a change in the candidate area characteristics for the candidate areas based on the obtained weather conditions for the duration for which the content is to be projected. For example, when control circuitry 504 obtains weather information for the 4:00 PM through 6:00 PM, the control circuitry determines the time of sunset (e.g., 5:00 PM) and predicts a change in candidate area characteristics based on the sunset time (e.g., reduction in amount of sunlight on wall 106 after 5:00 PM).

At step 1110, control circuitry 504 obtains an average score for the candidate area characteristics for the candidate areas for the duration for which the content is to be projected. For example, control circuitry 504 assigns a score of 1 to wall 106 for the time duration from 4:00 PM till 5:00 PM and a score of 7 for the time duration from 5:00 PM till 6:00 PM, thereby assigning an average score of 4. In some implementations, control circuitry 504 may assign wall 106 two separate scores corresponding to the different time durations to increase the accuracy of the system. At step 1112, control circuitry 504 determines the candidate area characteristics for the candidate areas based on the average score.

It should be noted that this embodiment can be combined with any other embodiment in this description and that process 1100 is not limited to the devices or control components used to illustrate process 1100 in this embodiment.

Figure 12:
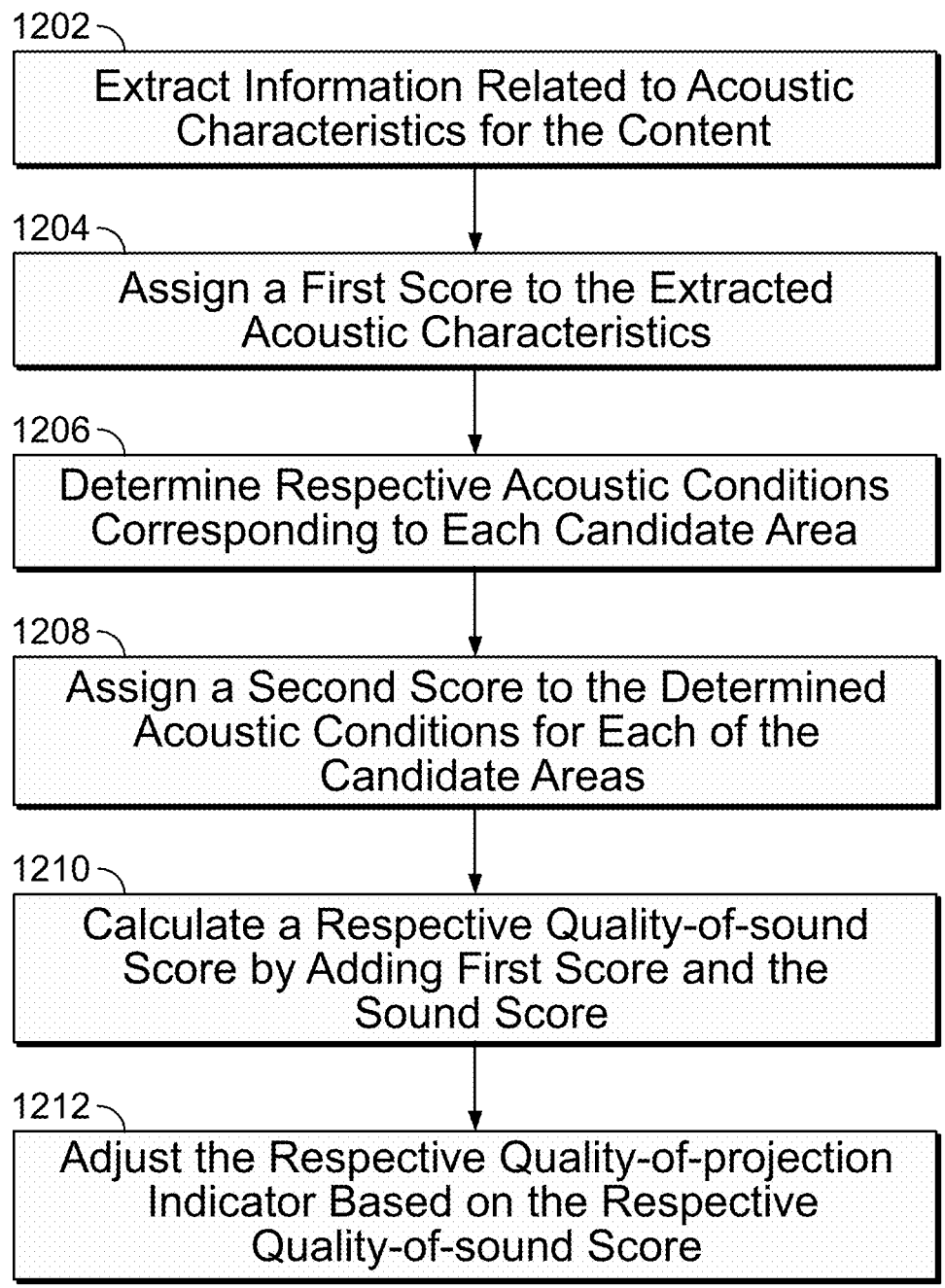
FIG. 12 is a flowchart of illustrative steps for adjusting the quality-of-projection indicator for the candidate areas based on the corresponding quality-of-sound score in accordance with some embodiments of the disclosure.

FIG. 12 is an embodiment of a process 1200 for adjusting the quality-of-projection indicator for each of the plurality of candidate areas based on the corresponding quality-of-sound scores. It should be noted that each step of process 1200 can be performed by control circuitry 504. Control circuitry 504 may be part of the projection device (e.g., a projector-equipped tablet or phone), or of a remote server separated from the projection device by way of communication network 514, or distributed over a combination of both. At step 1202, control circuitry 504 may extract, from the received content attributes, information related to acoustic characteristics. For example, control circuitry 504 identifies discussions from other users on a social media message board related to the content attribute for acoustics. For example, the control circuitry for the projection device, may determine that the movie, "The Dark Knight" has a significant amount of dialogue which gets drowned out with minimal ambient noise.

At step 1204, control circuitry 504 assigns a first score to the content attribute for acoustics. For example, for the movie "The Dark Knight," which includes a significant amount of dialogue which gets drowned out with minimal ambient noise, control circuitry 504 may determine that it is important to project the movie on an area which is exposed to minimal ambient noise (e.g., away from open windows or doors) and accordingly assign a score of 8. In another example, when the user wishes to project the video game "Fortnite," control circuitry 504 may determine that the acoustics characteristics of the video game do not impact the user experience and therefore assign a lower score of 3.

At steps 1206 and 1208, control circuitry 504 further determines candidate area acoustics characteristics for the candidate areas (e.g., walls 104 and 106) and assign a second score to the candidate areas. For example, control circuitry 504 may determine that a wall 104 in an office next to the door 210 has poor acoustic characteristics because of ambient sound coming in from the outside (step 1206) and assign wall 104 a score of 3 (step 1208), whereas a wall 106 away from the open door 210 may be assigned a score of 8.

At step 1210, control circuitry 504 of projection device 102 calculates a respective quality-of-sound score for the candidate areas by adding the first score to the second scores. For example, control circuitry 504, when projecting the movie, "The Dark Knight," calculates a quality-of-sound score of 11 for wall 104 (a first score of 8 assigned to the content added to the second score of 3 assigned to wall 104) and a quality-of-sound score of 16 for wall 106 (a first score of 8 assigned to the content added to the second score of 8 assigned to wall 106).

At step 1212, control circuitry 504 further adjusts the quality-of-projection indicator for the candidate areas (e.g., walls 104 and 106) based on the corresponding quality-of-sound scores. Specifically, control circuitry 504 adds the quality-of-sound scores to the corresponding combined characteristic scores for the candidate areas to generate an updated quality-of-projection indicator which accounts for the acoustic performance of the various candidate areas and acoustic characteristics of the content to be projected. For example, control circuitry 504, when projecting the movie "The Dark Knight," may calculate a quality-of-sound score of 11 for wall 104 (a first score of 8 assigned to the content added to the second score of 3 assigned to wall 104) and a quality-of-sound score of 16 for wall 106 (a first score of 8 assigned to the content added to the second score of 8 assigned to wall 106). Control circuitry 504 further adjusts the quality-of-projection indicator for walls 104 and 106 based on the corresponding quality-of-sound scores.

It should be noted that this embodiment can be combined with any other embodiment in this description and that process 1200 is not limited to the devices or control components used to illustrate process 1200 in this embodiment.

Figure 13:
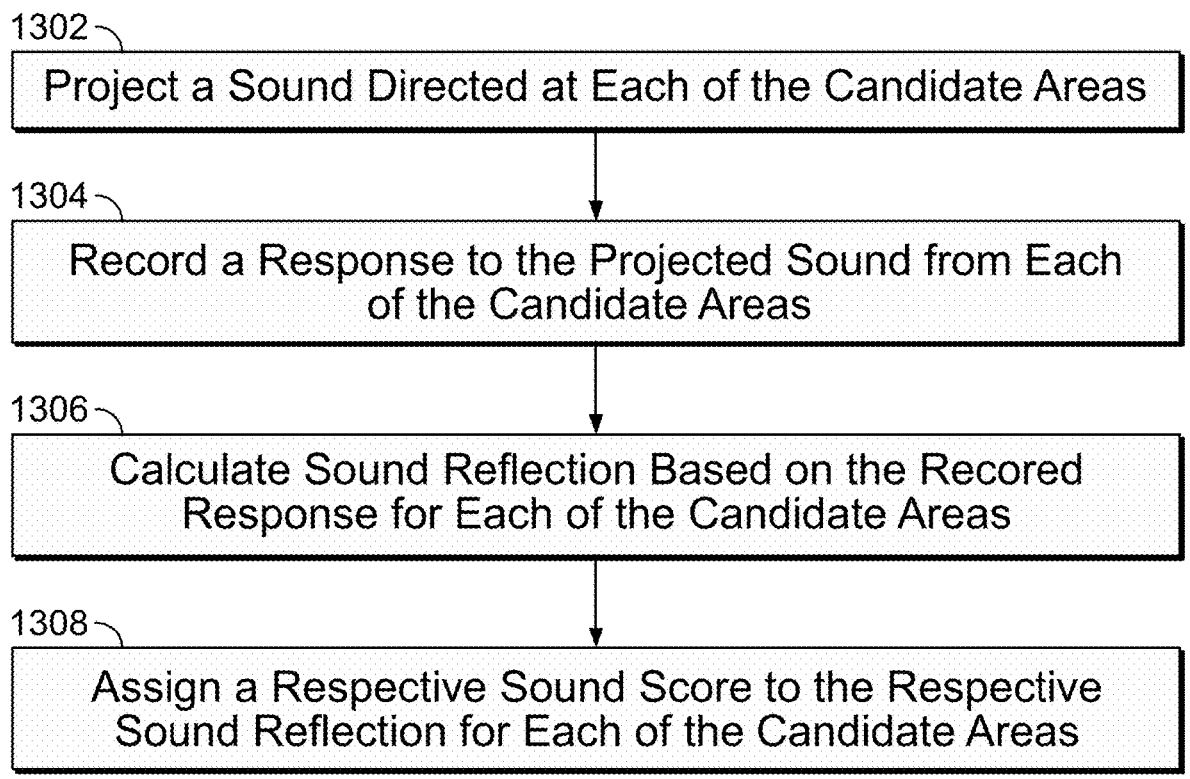
FIG. 13 is a flowchart of illustrative steps for calculating the second score for the candidate areas in accordance with some embodiments of the disclosure.

FIG. 13 is an embodiment of a process 1300 for calculating the respective second score corresponding to the quality-of-sound for each of the candidate areas. It should be noted that each step of process 1300 can be performed by control circuitry 504. Control circuitry 504 may be part of the projection device (e.g., a projector-equipped tablet or phone), or of a remote server separated from the projection device by way of communication network 514, or distributed over a combination of both. At step 1302, control circuitry 504 controls the speakers 514 to project a sound at the candidate areas. For example, control circuitry 504 may use the speakers 514 of projection device 102 to project a sound at the candidate areas (e.g., walls 104 and 106).

At step 1304, control circuitry 504 records a response to the projected sound from the candidate areas. For example, control circuitry 504 may use a receiver of projection device 102 to record a response to the projected sound from the candidate areas (e.g., walls 104 and 106). At step 1306, control circuitry 504 calculates a sound reflection based on the recorded response for each of the candidate areas. For example, control circuitry 504 may use well-known methods of determining acoustic responses of various surfaces to determine the amount of sound reflection from the recorded response. At step 1308, control circuitry 504 assigns a second score to the candidate areas based on the determined sound reflections from the recorded response. For example, content circuitry 504 may access a database storing scores corresponding to different amounts of sound reflections and retrieve a score corresponding to a sound reflection matching the determined sound reflections.

It should be noted that this embodiment can be combined with any other embodiment in this description and that process 1300 is not limited to the devices or control components used to illustrate process 1300 in this embodiment.

Figure 14:
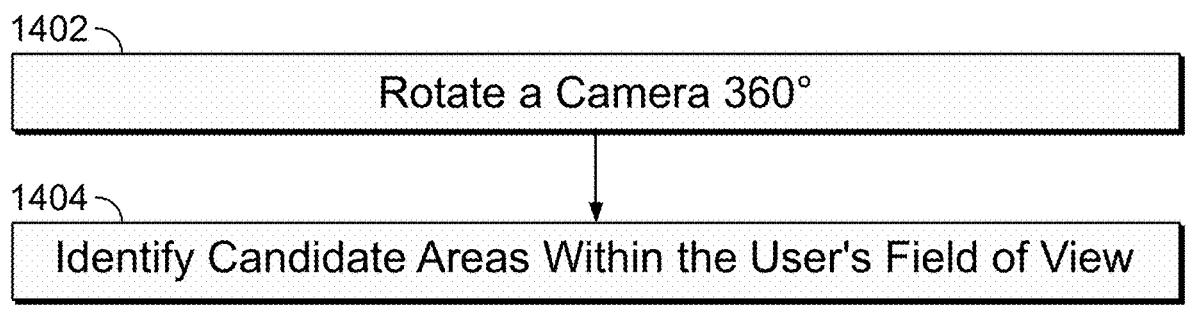
FIG. 14 is a flowchart of illustrative steps for identifying candidate areas in accordance with some embodiments of the disclosure.

FIG. 14 is an embodiment of a process 1400 for identifying a plurality of candidate areas. It should be noted that each step of process 1400 can be performed by control circuitry 504. Control circuitry 504 may be part of the projection device (e.g., a projector-equipped tablet or phone), or of a remote server separated from the projection device by way of communication network 514, or distributed over a combination of both. At step 1402, control circuitry 504, via a rotating capture module 518, captures an image of each of a plurality of candidate areas 104, 106, 108 within the field of view of the user. For example, control circuitry 504 of a cell phone 102 may prompt the user to capture an image of each area available in the user's immediate surroundings on which the content may be projected.

At step 1404, control circuitry 504 identifies candidate areas within the user's field of view. For example, as illustrated in FIGS. 1 and 2, projection device 102, via control circuitry 504, identifies walls 104 and 106, and the desk surface 108 as the candidate areas on which a content may be projected. It will be evident to a person possessing ordinary skill in the art that any number of available areas within the user's field of view may be selected as a candidate area.

It should be noted that this embodiment can be combined with any other embodiment in this description and that process 1400 is not limited to the devices or control components used to illustrate process 1400 in this embodiment.

Figure 15:
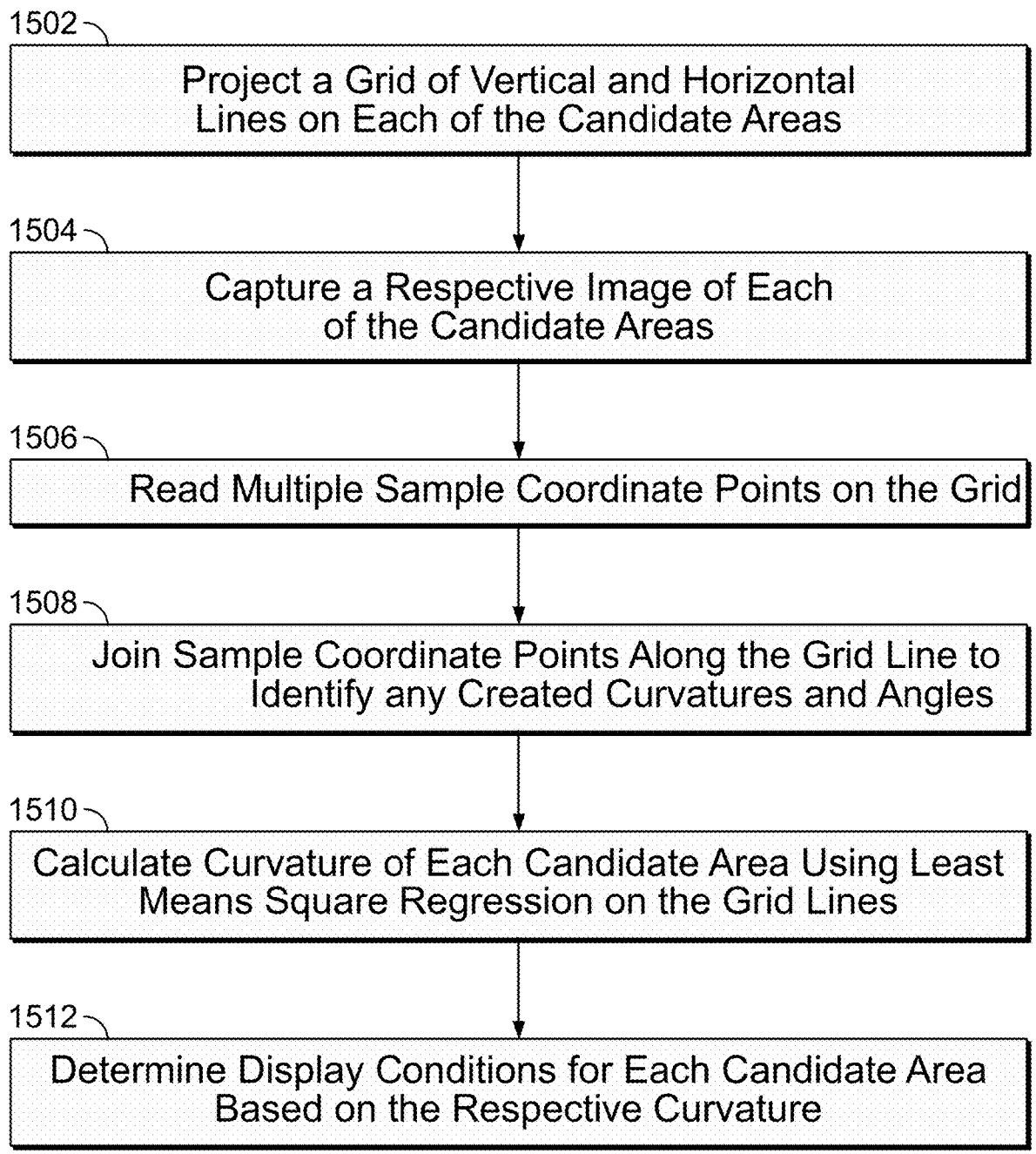
FIG. 15 is a flowchart of illustrative steps for calculating a curvature of the candidate areas in accordance with some embodiments of the disclosure.

FIG. 15 is an embodiment of a process 1500 for calculating a curvature of the candidate areas. It should be noted that each step of process 1500 can be performed by control circuitry 504. Control circuitry 504 may be part of the projection device (e.g., a projector-equipped tablet or phone), or of a remote server separated from the projection device by way of communication network 514, or distributed over a combination of both. Specifically, process 1500 is an example low-cost method for determining a curvature of the candidate areas to identify and select a target area on which to project the content. Specifically, control circuitry 504 determines the candidate area characteristics of the candidate areas 104, 106, 108 by calculating a respective curvature value and updating the corresponding quality-of-projection indicator based on the determined candidate area characteristics.

At step 1502, control circuitry 504 projects a pre-determined pattern on the candidate areas 104, 106, 108 where the pre-determined pattern includes a plurality of intersection points. For example, control circuitry 504, using a projector, projects a grid of vertical and horizontal lines on walls 104 and 106. At step 1504, control circuitry 504, via capture module 518, captures an image of the candidate areas (e.g., walls 104 and 106) with the grid projected thereon.

At step 1506, control circuitry 504 reads multiple sample coordinate points on the projected grid from the captured image. Specifically, control circuitry 504 selects, from each respective captured image, a subset of intersection points on the projected grid corresponding to each of the candidate areas. At step 1508, control circuitry 504 joins the selected sample coordinate points along the grid lines to identify any created curvature and angles. For example, control circuitry 504 overlays the image on a two-dimensional cartesian coordinate plane and scans the image for each of the selected intersection point belonging to a subset corresponding to the candidate areas.

At step 1510, control circuitry 504 applies a least means square regression model to the intersection points of the subset mapped on the two-dimensional cartesian plot to determine a curvature value for each of the respective plurality of candidate areas. For example, control circuitry 504 calculates a square of correlation coefficient for each of the subset of intersection points mapped on the two-dimensional cartesian plot to determine subsets of intersection points with a square of correlation coefficient value equal to 1. Control circuitry 504 identifies the candidate areas whose corresponding subset of intersection points have a square of correlation coefficient value equal to 1 (i.e., no curvature) and gives a preference to the identified candidate areas when selecting a target area on which to project the content.

At step 1512, control circuitry 504 updates the determined candidate area characteristics for the candidate areas based on the calculated curvature values. For example, control circuitry 504 may lower the quality-of-projection indicator for a candidate area determined to have a curvature, while increasing the quality-of-projection indicator for candidate areas having little to no curvature.

In a specific implementation of the above method, a camera is used to capture an image of a room. The captured image is sampled, randomly or by systematically pocking pixel points, to check for existing colors and range of colors in the captured image. A color complementing the sampled color is selected, and a two-dimensional grid is projected within the room in that complementary color such that the grid is visible. The grid may be projected with a constant difference between each line of the grid and a second image of the room is captured with the grid projected thereon. The second captured image is overlaid on a two-dimensional Cartesian coordinate plane. One or more subsets of coordinate points are selected from the second captured image and a square of correlation coefficient is calculated for each of the subsets. The subsets having a square of correlation coefficient of 1 and having the maximum number of coordinate points that are proximate are grouped together and the largest surface is selected for projecting content thereon.

It should be noted that this embodiment can be combined with any other embodiment in this description and that process 1500 is not limited to the devices or control components used to illustrate process 1500 in this embodiment.

The above-described embodiments of the present disclosure are presented for purposes of illustration and not of limitation, and the present disclosure is limited only by the claims which follow. Furthermore, it should be noted that features and limitations described in any one embodiment may be applied to any other embodiments herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method comprising:
receiving an input indicating a selection of a content item;
determining, based on content item metadata, a duration of the content item;
obtaining a weather condition for the duration of the content item;
based on the weather condition, predicting a change in a candidate area characteristic related to a candidate area on which the content is to be projected;
based on the prediction, determining a display condition for the candidate area;
capturing an image for the candidate area;
analyzing the captured image to assign a respective characteristic score to each of the candidate area characteristics; and
adding the respective characteristic score to calculate a combined characteristic score for the candidate area.

2. The method of claim 1, further comprising:
based on the display condition, selecting the candidate area as a target area to project the content item.

3. The method of claim 1, wherein the candidate area characteristic comprises at least one of a size, texture, color, reflectivity, intensity, or amount of ambient light.

4. The method of claim 1, wherein the combined characteristic score is used to determine the display condition.

5. The method of claim 1, further comprising:
detecting a weather event that leads to the change in the candidate area characteristic duration of the content item based on the weather condition;
obtaining a weather event time of the detected weather event;
dividing the content item into a first segment and a second segment, wherein the first segment ends at the weather event time and the second segment starts at the weather event time; and
calculating a respective segment score for the first segment and the second segment.

6. The method of claim 5, further comprising:
calculating an average segment score by averaging the respective segment score for the first segment and the second segment;
wherein the average segment score is used to determine the display condition.

7. The method of claim 5, further comprising:
based on the respective segment score, determining a target area for the first segment of the content item that is different from a target area for the second segment of the content item.

8. The method of claim 7, further comprising:
determining a start time and an end time of the content item based on the content item metadata, wherein the start time of the content item is a time of the received input and the end time of the content item is calculated based on the duration of the content item and the time of the received input.

9. The method of claim 8, wherein the target area for the first segment is selected to project the content item between the start time of the content item and the weather event time, and the target area for the second segment is selected to project the content item between the weather event time and the end time of the content item.

10. The method of claim 1, further comprising:
determining a start time and an end time of the content item based on the content item metadata, wherein the start time of the content item is a time of the received input and the end time of the content item is calculated based on the duration of the content item and the time of the received input.

11. A system comprising:
a storage device; and
control circuitry configured to:
receive an input indicating a selection of a content item;
determine, based on content item metadata, a duration of the content item;
obtain a weather condition for the duration of the content item;
based on the weather condition, predict a change in a candidate area characteristic related to a candidate area on which the content is to be projected;
based on the prediction, determine a display condition for the candidate area;
capture an image for the candidate area;

analyze the captured image to assign a respective characteristic score to each of the candidate area characteristics; and add the respective characteristic score to calculate a combined characteristic score for the candidate area.

12. The system of claim 11, wherein the control circuitry is further configured to:

based on the display condition, select the candidate area as a target area to project the content item.

13. The system of claim 11, wherein the candidate area characteristic comprises at least one of a size, texture, color, reflectivity, intensity, or amount of ambient light.

14. The system of claim 11, wherein the combined characteristic score is used to determine the display condition.

15. The system of claim 11, wherein the control circuitry is further configured to:

detect a weather event that leads to the change in the candidate area characteristic duration of the content item based on the weather condition;

obtain a weather event time of the detected weather event;

divide the content item into a first segment and a second segment, wherein the first segment ends at the weather event time and the second segment starts at the weather event time; and calculate a respective segment score for the first segment and the second segment.

16. The system of claim 15, wherein the control circuitry is further configured to:

calculate an average segment score by averaging the respective segment score for the first segment and the second segment;

wherein the average segment score is used to determine the display condition.

17. The system of claim 15, wherein the control circuitry is further configured to:

based on the respective segment score, determine a target area for the first segment of the content item that is different from a target area for the second segment of the content item.

18. The system of claim 17, wherein the control circuitry is further configured to:

determine a start time and an end time of the content item based on the content item metadata, wherein the start time of the content item is a time of the received input and the end time of the content item is calculated based on the duration of the content item and the time of the received input.

19. The system of claim 18, wherein the target area for the first segment is selected to project the content item between the start time of the content item and the weather event time, and the target area for the second segment is selected to project the content item between the weather event time and the end time of the content item.

20. The system of claim 11, wherein the control circuitry is further configured to:

determine a start time and an end time of the content item based on the content item metadata, wherein the start time of the content item is a time of the received input and the end time of the content item is calculated based on the duration of the content item and the time of the received input.

* * * * *